Figure 1:
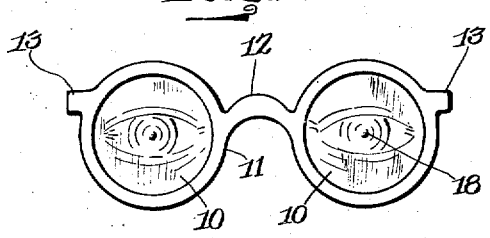

March 10, 1931. J. A. SMITH Re. 17,996

SPECTACLES AND GOGGLES

Original Filed June 18, 1924

INVENTOR.
John Anthony Smith
BY
Geo. P. Kimmel
ATTORNEY.

Reissued Mar. 10, 1931

Re. 17,996

UNITED STATES PATENT OFFICE

JOHN ANTHONY SMITH, OF SPOKANE, WASHINGTON, ASSIGNOR TO THE FUL-VUE SALES COMPANY, OF WASHINGTON, DISTRICT OF COLUMBIA

SPECTACLES AND GOGGLES

Original No. 1,739,049, dated December 10, 1929, Serial No. 720,762, filed June 18, 1924. Application for reissue filed March 4, 1930. Serial No. 433,153.

My invention relates to an improved construction of spectacle and goggle frames, by means of which the field of vision of the wearer is enlarged and additional protection afforded to life and limb when moving across the path of city travel, or other moving objects.

As spectacle frames are now generally constructed they are comprised of two component parts, to wit: the front, composed of nosepiece and rims for the purpose of holding the lenses before the eyes of the wearer and two temples, one right and one left, for the purpose of holding the front in correct position on the face of the wearer.

In accordance with the general custom, these temples, or side pieces, are attached to the outer edge of the rims holding the lenses at a point coincident with the points at which a horizontal plane passing through the pupils of the eyes of the wearer cuts the outer edge of said rims. As a consequence of this method of construction the materials of the temples is on the same horizontal plane with the pupils of the eyes of the wearer, with the result that should the wearer endeavor to obtain a vision of an object on either side, without first turning his head so as to obtain a direct line of vision of said object, his vision is impeded to the extent to which the material of which the temples or side pieces are composed interferes with his line of vision.

As will be readily seen in cases where, as is now in very common use, the spectacle frames are composed of horn, shell, celluloid products, or other material necessitating temples of heavy construction so as to secure the desired strength and rigidity, this interference may prove to be a serious bar to side vision, and in the case of crossing of modern city streets, at right angles to the line of traffic, may result in serious danger to the life and limb of the wearer as the result of his inability to obtain a clear view of approaching automobiles and other moving objects, which owing to the dark field caused on either side of the wearer as the result of the interference of the temple material with his side vision, are thus given an opportunity to come upon such wearer from either side, within the area of such dark field, without the wearer being warned of their approach.

In order to eliminate this dark field, thereby securing to the spectacle or goggle wearer an unimpeded side field of vision, as is the case with the natural eye, I have invented a spectacle frame in which the point of attachment of the temples or side pieces to the front is raised to a point substantially above the points at which the horizontal plane passing through the pupils of the eyes of the wearer cuts the outer edge of the rims of the front, with the result that when the glasses are worn, the material of which the temples are composed in no way interferes with the side vision of the spectacle wearer and, even while wearing the spectacles, he has at all times, without the necessity of turning his head in order to obtain a direct vision of objects approaching from either side, as free and untrammeled vision of such objects as if he were at the time actually not wearing spectacles. Or in other words the dark field on either side, caused by the interference of the temples with the side vision of the wearer, and the resultant danger to life and limb, is entirely eliminated.

It will be seen from the foregoing that the essence of my invention consists in the raising of the points of attachment of the temples to the front to a point substantially above the points at which the horizontal plane passing through the pupils of the eyes of the wearer cuts the outer edges of the spectacle rims, and that the form of the front, or the material of which it is composed, or the form of the temples, or the material of which they are composed, or the method of attachment used, whereby the temples are attached to the front, are merely incidental, and may be varied to suit the individual taste or requirement of those who may wish to avail themselves of the improved method of spectacle construction embodied herein.

Figure 2:
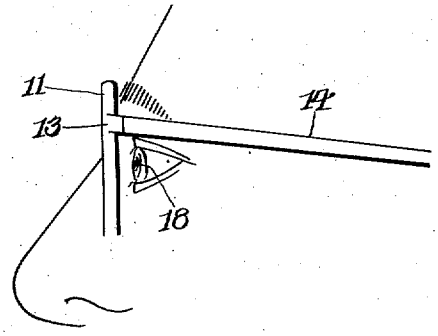

The invention will be hereinafter particularly described, pointed out in the claims and illustrated in the accompanying drawing, in which Figure 1 is a front view of a spectacle frame, the direct view showing only a front comprising two rims, lugs for connecting temples and a nosepiece, the rims containing lenses, the temples broken away, and illustrating the position of the eyes of the wearer with relation to the position of the point of temple attachment on the frame front. Figure 2 is a side view of the same in position on the human head and illustrating the relative position of the temples and the pupils of the eyes; and Figure 3 is a rear view of the same, showing a front containing lenses, with temples attached in a folded position.

In a detail description, in which like numerals refer to like parts throughout the several views, the lenses 10 are mounted as usual in rims 11 connected by a nosepiece 12. At points substantially above points at which a horizontal line projecting through the center of the pupils of the eyes 18 intersects the outer edges of the rims 11 are laterally projecting lugs 13, to which are secured the temples 14, which arrangement leaves the side field of vision of the wearer clear, as shown in Figure 2.

Figure 3:
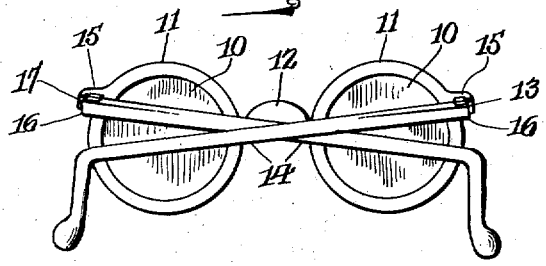

The joining of the temples 14 to the lugs 13 may be any connection that will permit of the folding of the temples 14, under as hinges 15, as shown in Figure 3. The temples have squared ends 16 so that when the temples 14 are expanded for use, as shown in Figure 2, these squared ends 16 of the temples 14 will have a firm setting against the portions or faces 17 of the lugs 13. The lugs 13 are arranged on the temple sides of the lenses and provide temple end piece connections. Each lug 13 is disposed or located between the center of the pupil of the eye and top of the lens when in place on the face. The under and upper sides of each lug 13 blend with the under and upper sides respectively of that rim with which the lug is associated. The rims in connection with the bridge provide a holding means for the lenses.

The pivotal engagement of a temple with a lug is substantially throughout the width of the lug. The under side of each temple forms a continuous unbroken line at its connection to the lens holding means. The temples are pivotally connected to the lugs in a manner to form an acute angle between the under side of the temple and the eye side of the lens holding means. The end pieces are on the same inclination as the temples forming an unbroken line. Under such conditions it eliminates the downward slipping from the bridge of the nose.

The inclination and acute angle of the temples carry the temples off of or above the wedge of the cheek bones. In the old form of spectacles the temples fell on the wedge of the cheek bones which would cause the temples to rise, lifting the ear loops off of the ears and allowing the lenses to slip forward. This objection is prevented by disposing the temples at an inclination and acute angle.

It will be noted when the spectacles are in position before the eyes the endpieces or lugs are disposed horizontally and in Figure 3 that where the axial line of each temple crosses the line of the edge of the lens when the temple is folded, the angle included between the underside of said line and the edge of the lens is an acute angle. It is clear that if the endpieces and temples were attached in alignment with the horizontal centers of the lenses the said included angle would be ninety degrees and not acute when the temples are folded. Therefore when the endpieces and temples are moved up to the position shown the relationship of the endpieces, temples and edges of the lenses is changed in order that the temples fold against the lenses in proper position.

It will be noted in Figures 1 and 3 that the endpieces 13 and the bridge 12 all lie in a substantially straight horizontal line. That with reference to Figure 3 the temples 14 are provided with portions to fit behind the ears. The inner side of the bridge 12 is adapted to bear against the face of the wearer. As the endpieces 13 are located above the pupils of the eyes and in substantial alignment with the bridge 12 it is apparent that the temples act as levers when secured behind the ears and tend to draw the bridge 12 against the face to hold the spectacles in set position to prevent downward sliding thereof.

In accordance with the patent statutes I have described the principle of my invention, together with the construction which I consider to represent the best embodiment thereof, but I desire it understood that the construction shown is merely illustrative, that the invention may be carried out by other means and applied to uses other than those above set forth within the scope of the following claims.

What I claim is:

1. In spectacles, a frame having laterally projecting temple lugs flush with the inner faces of the rims and located substantially above the horizontal axis of the rims which passes through the center line of the pupils of the eyes, temples having squared ends and hinged to the lugs, the hinge joints being inset from the free ends of the lugs in such manner that the temples will cross the front, and will have a firm setting against the flush faces of the lugs when the temples are expanded to hold the lenses at a proper angle.

2. In spectacles and the like, means for holding a pair of lenses, a bridge member connecting the nasal sides of said means together, temple endpieces on the temple sides of said means in fixed relation thereto and lying above the pupils of the eyes when the spectacles are in place before the eyes, a pair of temples, and pivotal connections between the temples and the endpieces in fixed relation to said lens holding means and disposed at an acute angle with respect to the edges of the lenses whereby each temple has its axial line crossing the line of the edge of a lens at an acute angle on the underside of said axial line when folded against the lenses.

3. In spectacles and the like, means for holding a pair of lenses, a bridge member connecting the nasal sides of said means, temple endpieces in fixed relation to the temple sides of said means and being located wholly above the centers of the pupils of the eyes and below the top of the lenses when the spectacles are in place before the eyes, a pair of temples, pivotal connections between said temples and endpieces whereon the temples may be moved from folded to open position, said pivotal connections being secured in fixed relative position with said endpieces and disposed at an acute angle with respect to the edges of the lenses whereby each temple has its axial line crossing the line of the edge of a lens at an acute angle on the underside of said axial line when folded against a lens.

4. In a spectacle frame in combination with lens holding means, a temple endpiece connection on each temple side of said lens holding means and located wholly above the centers of the pupils of the eyes when the spectacles are in place before the eyes, the underside of said endpiece being inclined with respect to the plane of the lenses, the rear portion being lower than the front, temples, and pivotal means connecting the temples with the said endpieces, the line of inclination of said temples being the same as that of the undersides of the endpieces.

5. In spectacles and the like, means for holding a pair of lenses, a bridge member connecting the nasal sides of the lens holding means and having a portion for bearing against a part of the wearer's face, temple endpieces on the temple sides of said means above the centers of the pupils of the eyes when the spectacles are in place on the face, a pair of temples, and a single pivotal connection between each temple and endpiece disposed at an acute angle with respect to the edge of a lens, the said portion of the bridge member for bearing against the face being substantially in a straight horizontal line passing through the endpieces for coaction with the pivotal connections and the temples when the latter are secured behind the ears for anchoring the spectacles in set position to prevent downwardly sliding.

6. In spectacles and the like, means for holding a pair of lenses, a bridge member connecting the nasal sides of the lens holding means, temple endpieces on the temple sides of the lens holding means in fixed relation to the lens holding means and located thereon to lie permanently above the centers of the pupils of the eyes when the spectacles are in place before the eyes, a pair of temples, said fixed endpieces and temples being provided with coacting bearing members, and pivots rotatably connecting the said coacting members, said pivots being in fixed relation to said lens holding means, endpieces and temples, the axes of said pivots extending upwardly and downwardly substantially normal to the longitudinal axes of the forward portions of the temples, the bearing faces of the coacting members of the fixed endpieces and temples engaging with each other and extending horizontally on their rear edges when in position before the eyes and the said longitudinal axes of the temples when the temples are folded over the lenses being divergent to the normals of the tangents at the points where said axes intersect the edges of the lenses respectively.

7. In spectacles and the like, means for holding a pair of lenses, a bridge connecting the nasal sides of said means, temple endpieces on the temple sides of said means extending horizontally when in place before the eyes and being divergent to the normals of the tangents at the points of intersection of the endpieces and the edges of the lenses, said endpieces being in fixed relation to said means and located on the latter permanently above the centers of the pupils of the eyes when the spectacles are in place before the eyes, a pair of temples, said fixed endpieces and temples being provided with coacting bearing members, the rear edges of which extend horizontally when in position before the eyes, and pivots rotatably connecting the said coacting bearing members, said pivots being in fixed relation to said means, endpieces and temples.

8. In spectacles and the like, means for holding a pair of lenses, a bridge connecting the nasal sides of said means, temple endpieces on the temple sides of said means and extending horizontally when in position before the eyes, said endpieces being in fixed relation to said means and located on the latter permanently above the centers of the pupils of the eyes when the spectacles are in place before the eyes, a pair of temples, said fixed endpieces and temples being provided with coacting bearing members having their rear edges horizontal when in place before the eyes, and pivots rotatably connecting the said coacting bearing members, said pivots being in fixed relation to said means, endpieces and temples, said bridge and endpieces being located on said means substantially in a straight line at right angles to the axes of the pivots whereby said temples and connections have the appearance of lying in the same horizontal plane when the spectacles are in place on the face when viewed from the front.

9. In spectacles and the like, means for holding a pair of lenses, a bridge connecting the nasal sides of said means, temple endpieces on the temple sides of said means extending horizontally and lying above the centers of the pupils of the eyes when the spectacles are in place before the eyes, a pair of temples, said endpieces and temples being provided with coacting bearing members having their rear edges horizontal when in place before the eyes, and a single pivotal connection between the coacting bearing members of each temple and endpiece, the portion of the temple sides lying between the ears and the temple connections to the endpieces, the said bridge member and the said endpieces all apparently lying substantially in a straight horizontal line when the spectacles are in place before the eyes when viewed from the front.

10. In spectacles and the like, means for holding a pair of lenses, a bridge member connecting the nasal sides of said means, temple endpieces on the temple sides of said means and lying above the centers of the pupils of the eyes when the spectacles are in place before the eyes, a pair of temples, said endpieces and temples having coacting bearing members, said endpieces being inclined with respect to the plane of the lenses in the direction of their thickness, the rear portion being lower than the front, and pivotal means rotatably connecting the coacting bearing members of the temples and endpieces, the longitudinal axes of the temple sides having substantially the same inclination as the said endpieces and lying in substantial alignment therewith when viewed from the sides.

In testimony whereof, I affix my signature hereto.

JOHN ANTHONY SMITH.